(12) United States Patent
Krishnasamy Venugopal et al.

(10) Patent No.: US 12,493,719 B2
(45) Date of Patent: Dec. 9, 2025

(54) DE-IDENTIFICATION OF PERSONALLY IDENTIFIABLE INFORMATION

(71) Applicant: Dayforce US, Inc., Minneapolis, MN (US)

(72) Inventors: Shanmugaraja Krishnasamy Venugopal, Leander, TX (US); Steve VanWieren, Woodstock, GA (US)

(73) Assignee: Dayforce US, Inc., Minneapolis, MN (US)

( * ) Notice: Subject to any disclaimer, the term of this patent is extended or adjusted under 35 U.S.C. 154(b) by 91 days.

(21) Appl. No.: 18/610,945

(22) Filed: Mar. 20, 2024

(65) Prior Publication Data
US 2025/0298921 A1 Sep. 25, 2025

(51) Int. Cl.
*G06F 21/62* (2013.01)

(52) U.S. Cl.
CPC ................ *G06F 21/6254* (2013.01)

(58) Field of Classification Search
CPC .................................. G06F 21/6254
See application file for complete search history.

(56) References Cited

U.S. PATENT DOCUMENTS

| | | | |
|---|---|---|---|
| 2019/0266352 A1* | 8/2019 | Gkoulalas-Divanis | ...................... G06F 21/6254 |
| 2019/0272387 A1 | 9/2019 | Gkoulalas-Divanis | |
| 2021/0176215 A1 | 6/2021 | Gkoulalas-Divanis et al. | |
| 2021/0334455 A1* | 10/2021 | Gkoulalas-Divanis | ...................... G06F 40/216 |
| 2024/0119175 A1* | 4/2024 | Middleton | ........... G06N 3/0895 |

OTHER PUBLICATIONS

Podlesny Nikolai Jannik: "Quasi-Identifier Discovery to Prevent Privacy Violating Inferences in Large High Dimensional Datasets", Hasse Plattner Institute for Digital Engineering, Mar. 15, 2023 (Mar. 15, 2023), pp. 1-159, XP093280137, Potsdam, Germany DOI: 10.25932/publishup-58784 Retrieved from the Internet: URL:https://publishup.uni-potsdam.de/opus4-ubp/files/58784/podlesny_diss.pdf [retrieved on May 22, 2025] Section 4.1.

(Continued)

*Primary Examiner* — Frantz B Jean
(74) *Attorney, Agent, or Firm* — Merchant & Gould P.C.

(57) ABSTRACT

The present disclosure is directed to methods and systems for data-driven de-identification tool that can detect personally identifiable information (PII) elements within a given dataset and apply selective mapping transformations rules to de-identify the dataset. The disclosed data de-identification tool identifies direct identifiers, quasi-identifiers and unique values within a structured dataset in an example embodiment. The data de-identification tool then transforms these potentially personal or sensitive data elements into de-identified data elements and replaces the identified direct identifiers, quasi-identifiers and unique values within the structured dataset with the de-identified data elements. The data de-identification tool calculates a risk of re-identification and based on the risk level, repeat the de-identification process iteratively until the risk levels are within an acceptable range.

20 Claims, 8 Drawing Sheets

(56) References Cited

OTHER PUBLICATIONS

Antonatos Spiros et al: "PRIMA: An End-to-End Framework for Privacy at Scale", 2018 IEEE 34th International Conference on Data Engineering (ICDE), IEEE, Apr. 16, 2018 {Apr. 16, 2018), pp. 1531-1542, XP033426914, DOI: 10.1109/ICDE.2018.00171 [retrieved on Oct. 24, 2018] Section IV.A-IV.C.
Abhinav Palia et al: "Utilizing Shannon's Entropy to Create Privacy Aware Architectures", arxiv.org, Cornell University Library, 201 Olin Library Cornell University Ithaca, NY 14853, Sep. 13, 2021 (Sep. 13, 2021), XP091052792, Section 4; p. 6.
International Search Report and Written Opinion for PCT/IB2025/052945 (Jun. 11, 2025).

\* cited by examiner

DE-IDENTIFICATION OF PERSONALLY IDENTIFIABLE INFORMATION

FIELD

Example aspects described herein relate generally to de-identification of personally identifiable information within a dataset and in particular to identifying and transforming direct identifiers, quasi-identifiers and unique values within a dataset to de-identified data until the risk of re-identification of personally identifiable information within the dataset meets a predetermined threshold.

BACKGROUND

In the domain of data management, a significant challenge revolves around the inclusion of personally identifiable information (PII) within datasets. This PII encompasses a wide spectrum of personal or sensitive details, including names, addresses, social security numbers, financial records, government identifiers, email addresses, and phone numbers.

In recent years, the paramount importance of safeguarding data privacy has grown substantially, garnering heightened attention from both consumers and regulatory authorities. This heightened concern has led to the emergence of stringent data privacy regulations and requirements.

Addressing this landscape of challenges, traditional strategies for data de-identification have predominantly relied on manual techniques tailored to specific applications. However, this approach is riddled with several significant impediments. Firstly, the manual nature of these techniques introduces inefficiencies, demanding substantial time and resources. Secondly, the inherent subjectivity in manual de-identification introduces inconsistencies and potential biases. Lastly, the lack of standardized methodologies for data de-identification compounds the intricate landscape of privacy compliance.

Technological approaches have attempted to overcome these limitations by deploying automated, objective, and standardized methodologies capable of de-identifying data containing PU. However, these solutions still have significant technological challenges. One arduous technological challenge involves striking a balance between safeguarding privacy and preserving data utility. Altering or purging PU to achieve anonymity can compromise the data's value for analytical and research objectives. Moreover, even subsequent to the application of de-identification techniques, there remains a risk that adept individuals or sophisticated algorithms could potentially re-identify individuals by amalgamating ostensibly anonymous data with external information. In scenarios where multiple datasets are amalgamated, ensuring that de-identified data originating from diverse sources remains impervious to retracing back to the same individual can be intricate, potentially leading to inadvertent re-identification. Furthermore, the act of consolidating data to assure anonymity can result in a loss of granularity, thereby complicating endeavors to extract intricate insights or detect trends within the data. Adding to the complexity, the execution of de-identification methods on extensive datasets can engender substantial computational overhead, thereby impacting processing times and the allocation of resources. It is with respect to these and other general considerations that embodiments have been described.

SUMMARY

Embodiments of the disclosure are directed to identifying data elements within a structured dataset that includes personally identifiable information (PII) and transforming PII elements to de-identifiable data.

In a first embodiment, a method to de-identify personally identifiable information (PII) within a structured dataset is disclosed. The method comprises: (a) receiving the structured dataset, the structured dataset including a plurality of data elements; (b) receiving a direct identifier threshold value; (c) based on the direct identifier threshold value, identifying direct identifiers within the structured dataset; (d) creating a non-direct identifier structured dataset by removing the direct identifiers from the structured dataset; (e) receiving a quasi-identifier threshold value; (f) based on the quasi-identifier threshold value, identifying quasi-identifiers within the non-direct identifier structured dataset; (g) creating a non-quasi-identifier structured dataset by removing the quasi-identifiers from the non-direct identifier structured dataset; (h) receiving a unique value threshold value; (i) based on the unique value threshold value, identifying unique values within the non-quasi identifier structured dataset; (j) applying one or more transformation rules to transform each of the direct identifiers, the quasi-identifiers and the unique values into respective de-identified data elements; (k) generating a de-identified structured dataset by replacing the direct identifiers, quasi-identifiers and the unique values within the structured dataset with the respective de-identified data elements.

In a second embodiment, a de-identification system is disclosed, the de-identification system comprises: one or more processors; and system memory, the system memory including instructions which, when executed by the processing unit, cause the one or more processors to: (a) receive the structured dataset, the structured dataset including a plurality of data elements; (b) receiving a direct identifier threshold value; (c) for each data element of the plurality of data elements of the structured dataset: calculating a first entropy score; comparing the first entropy score of the data element to the direct identifier threshold value; and upon determining that the first entropy score meets or exceeds the direct identifier threshold value, identifying the data element of the structured dataset as including direct identifiers; (d) create a non-direct identifier structured dataset by removing the direct identifiers from the structured dataset; (e) receiving a quasi-identifier threshold value; (f) for each data element of the plurality of data elements of the non-direct identifier structured dataset: calculating a second entropy score; calculating an external influence score; creating a combined score by aggregating the second entropy score to the external influence score; comparing the combined score to the quasi-identifier threshold value; and upon determining that the combined score meets or exceeds the quasi-identifier threshold value, identifying the data element of the non-direct identifier structured dataset as including quasi identifiers; (g) applying one or more transformation rules to transform each of the direct identifiers, and the quasi-identifiers into respective de-identified data elements; and (h) generating a de-identified structured dataset by replacing the direct identifiers and the quasi-identifiers within the structured dataset with the respective de-identified data elements.

In a third embodiment, a method to de-identify personally identifiable information (PII) within a structured dataset is disclosed. The method comprises: (a) receiving the structured dataset, the structured dataset including a plurality of data elements; (b) identifying direct identifiers within the structured dataset based on a direct identifier threshold value; (c) creating a non-direct identifier structured dataset by removing the direct identifiers from the structured dataset; (d) identifying quasi-identifiers within the non-direct identifier structured dataset based on a quasi-identifier threshold value; (e) creating a non-quasi-identifier structured dataset by removing the quasi-identifiers from the non-direct identifier structured dataset; (f) identifying unique values within the non-quasi-identifier structured dataset based on a unique value threshold value; (g) applying one or more transformation rules to transform each of the direct identifiers, the quasi-identifiers and the unique values into respective de-identified data elements; and (h) generating the de-identified structured dataset by replacing the direct identifiers, the quasi-identifiers and the unique values within the structured dataset with the respective de-identified data elements; (i) evaluating a risk of re-identification of the PII within the de-identified structured dataset; (j) upon determining that the risk of re-identification of the PII within the de-identified structured dataset meets or exceeds a predetermined re-identification threshold value, (k) generating an adjusted threshold values by reducing the quasi-identifier threshold value by a predetermined amount; (l) replacing the quasi-identifier threshold value with the adjusted quasi-identifier threshold value; and (m) until determining that the risk of re-identification of the PII within the de-identified structured dataset is less than the re-identification threshold value, iteratively repeating (d)-(l).

BRIEF DESCRIPTION OF DRAWINGS

The features and advantages of the example embodiments of the invention presented herein will become more apparent from the detailed description set forth below when taken in conjunction with the following drawings.

DETAILED DESCRIPTION

Figure 1:
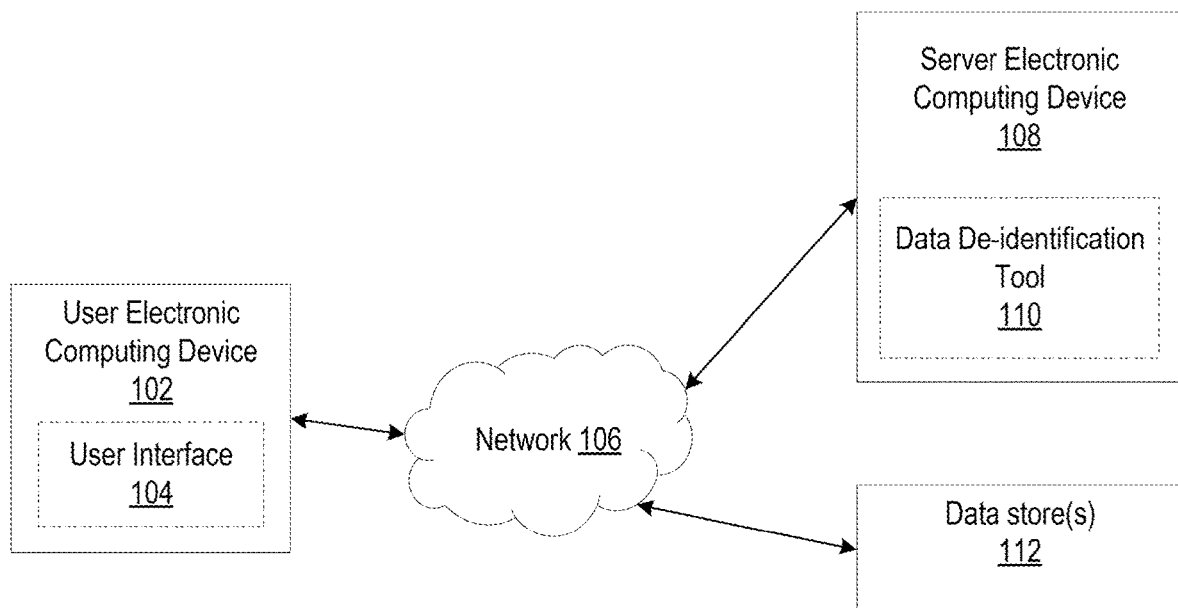
FIG. 1 illustrates a data de-identification system that is configured to de-identify PII within structured datasets, according to an example embodiment.

In research, analytics, and other data-intensive applications where data privacy is of utmost importance, the necessity often arises for datasets devoid of any personally identifiable information (PII). The act of de-identifying a dataset generally involves the alteration or removal of PII data within it, rendering it incapable of singling out individual persons. However, it is desirable to ensure that this transformation of PII retains the structural integrity and formatting of the data elements. This preservation allows the dataset to sustain its intended utility and relevance, while simultaneously mitigating the risk of PII leading to the identification of specific individuals.

Generally, the present disclosure is directed to a data de-identification tool that automatically identifies potential PII data elements within a structured dataset and transforms the identified PU data elements into transformed data elements that can no longer be used to identify any individuals. Data elements are columns of data within the structured dataset. In an example embodiment, the disclosed de-identification tool identifies direct identifiers, quasi-identifiers, and unique values within a data set and then de-identifies them within the data set.

A direct identifier, as used herein, generally refers to values of data elements that can be used to directly identify an individual. In other words, the identity of an individual can be discerned by the direct identifier without needing any additional data. Examples of direct identifiers include name, address, government identifiers, social security number, phone numbers, etc.

A quasi-identifier, as used herein, generally refers to values of data elements that do not directly identify an individual but when combined with other data, can be used to identify an individual within the structured data set. Quasi-identifiers do not directly identify an individual but can identify an individual when combined with an additional piece of information. For example, even without a name or other direct identifiers, a role of an individual within an organization, such as "sales associate," and the hiring date of that individual, such as Aug. 1, 2012, can, together, be used to identify an individual.

A unique value, as used herein, generally refers to values of data elements that are unique enough within a dataset that it is becomes obvious or highly likely that it is associated with a particular individual. For example, gender may contain a unique value if, within an organization of 100 individuals, there are 99 employees that identify as male, and 1 employee that identifies as female. Thus, although gender is not typically considered to include PII, in particular cases, it can contain a unique value that can identify an individual.

After identifying the direct identifiers, quasi-identifiers and unique values within the structured dataset, the data de-identification tool applies selective mapping transformation rules to de-identify the potential PII within the structured dataset.

Aspects of the embodiments described herein address a practical issue of data privacy and security, enabling the safe utilization of datasets containing personal or sensitive information while minimizing the risk of compromising individuals' identities. In addition, the architecture described herein involves technical steps, including automated data analysis, identification of different types of PII, and the application of selective mapping transformation rules.

FIG. 1 illustrates a data de-identification system 100 that is configured to de-identify PII within structured datasets, according to an example. The data de-identification system 100 includes a user electronic computing device 102, a network 106, a server electronic computing device 108 and one or more data stores 112. The server electronic computing device 108 is configured to include a data de-identification tool 110.

In some examples, the user electronic computing device 102 can be a desktop computer, a laptop computer, virtual reality user device, a mobile electronic computing device such as a smartphone or a tablet computer. In an example embodiment, the user electronic computing device 102 includes a user interface 104 that receives inputs from a user and/or displays output associated with the data de-identification tool 110, thus allowing the user to interface with the data de-identification tool 110 within the server electronic computing device 108.

Although a single user electronic computing device 102 is shown, the data de-identification system 100 allows a plurality of computing devices to connect to the data de-identification tool 110 on the server electronic computing device 108.

In some examples, the network 106 is a computer network, such as the Internet. The user using the user electronic computing device 102 can access the server electronic computing device 108 via the network 106.

In some examples, the server electronic computing device 108 is a server computing device. Although a single electronic computing device is shown, the server electronic computing device 108 can be implemented with multiple computing devices, such as a server farm or through cloud computing.

A structured dataset, as used herein, generally refers to a collection of data that is organized in a systematic and predefined manner. The data de-identification tool 110 allows a user to input, via the user interface 104, input parameters associated with the de-identification of PII within a structured dataset. In an example embodiment, the input parameters include direct identifier threshold value, quasi-identifier threshold value, unique value threshold value, re-identification threshold value, any user adjustments to identified lists of direct identifiers, quasi-identifiers and unique values. Based on the input parameter, the data de-identification tool 110 can automatically analyze a structured dataset to identify PII, including direct identifiers, quasi-identifiers and unique values, and use one or more transformation rules to transform the identified PII to make them de-identifiable. Example configurations of the data de-identification tool 110 are described in further detail in relation to FIGS. 2-8.

In some embodiments, data store 112 includes one or more electronic databases that store one or more structured datasets that include PII. The data store 112 can be maintained by the same entity that maintains the server electronic computing device 108. Alternatively, data store 112 can be maintained by one or more external enterprises. The data store 112 can be accessed by server electronic computing device 108 to retrieve the one or more structured data sets and to store the transformed structured datasets with all PII removed.

Figure 2:
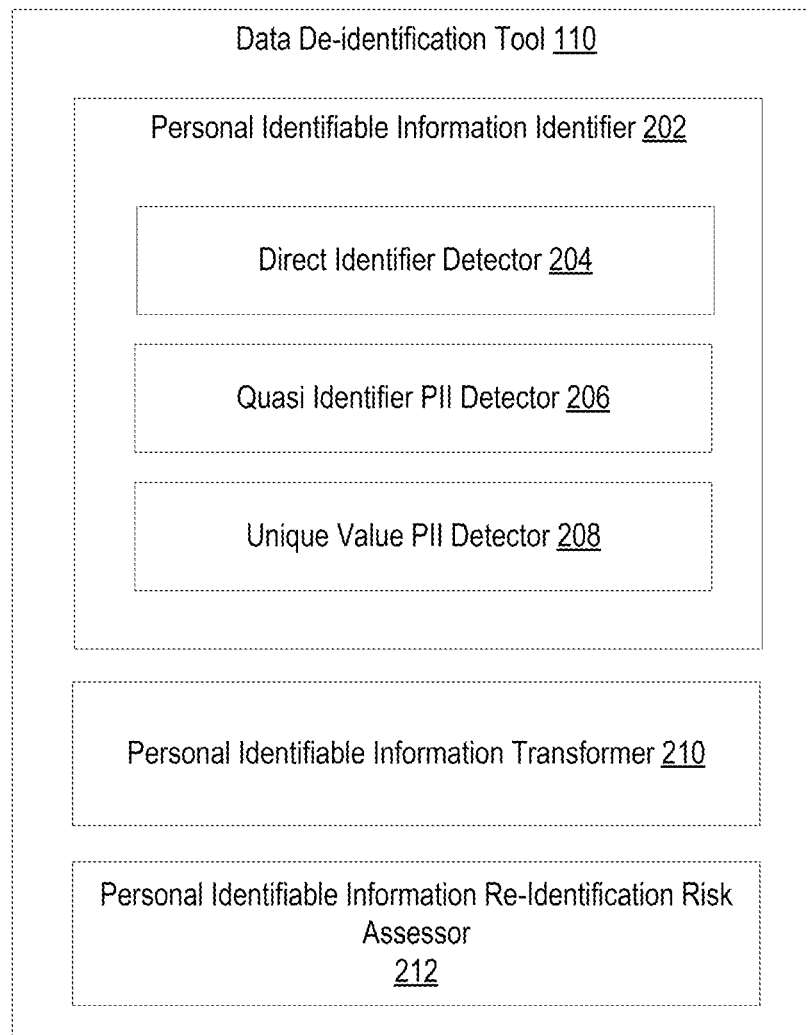
FIG. 2 illustrates an example configuration of the data de-identification tool from FIG. 1.

FIG. 2 illustrates a configuration of the data de-identification tool 110 from FIG. 1, according to an example. In an example embodiment, the data de-identification tool 110 is implemented using one or more components. For example, the data de-identification tool 110 comprises a personally identifiable information (PII) identifier 202, a personally identifiable information (PII) transformer 210 and a personally identifiable information (PII) re-identification risk assessor 212.

The PII identifier 202 is configured to receive a structured dataset and identify direct identifiers, quasi-identifiers and unique values within that structured dataset. Direct identifiers, quasi-identifiers and unique values can be values of data elements within the structured dataset that directly or indirectly allow a third party viewing the structured dataset to identify individual person(s) corresponding to the data within the structured dataset. The PII identifier 202 may be implemented using one or more sub-components. For example, PII identifier 202 comprises a direct identifier detector 204, a quasi-identifier detector 206, and a unique value detector 208.

The direct identifier detector 204 is configured to analyze each data element within the structured data set and identify any direct identifiers within the structured dataset. Once a direct identifier(s) is identified within the structured dataset, the direct identifier detector 204 creates a list of direct identifiers that includes all direct identifiers identified within the structured dataset.

Generally, the direct identifiers are identified by first calculating an entropy score that measures the uniqueness or randomness of the values of data elements of the structured dataset and then evaluating whether the calculated entropy score is above a certain direct identifier threshold value. For example, one example method of calculating the entropy score for a particular value of the data element within the structured dataset is by using Equation 1 below:

$$H(A) = -p(A) * \log_2(p(A)) \qquad (1)$$

where, H(A) is the entropy score of a particular value of a data element with an outcome of "A" within the structured dataset, and p(A) is the probability of the outcome of "A" among the possible outcomes for that dataset. For example, for a dataset such as the one disclosed in Table 1 below, the entropy score for "Alex Smith" within the data element "Name" can be calculated as follows: P("Alex Smith")= $-(1/5)*\log_2 (1/5)=0.546$, whereas the entropy score for "45" within the data element "Age" can be calculated as follows: $-(2/5)*\log_2 (2/5)=0.529$.

TABLE 1

| Name | Age | Gender | Weight | ZipCode |
|---|---|---|---|---|
| Alex Smith | 45 | M | 72 | 12345 |
| Brian Smith | 45 | M | 72 | 12345 |
| Charles Smith | 21 | M | 58 | 45678 |
| Donna Smith | 21 | F | 45 | 45678 |
| Elaine Smith | 64 | F | 45 | 45678 |

In the above example, the normalized entropy score for the data element of "Name" can be calculated by aggregating the entropy scores of each of the value of the data elements and normalizing it to have a value between 0 and 1 by dividing the aggregated entropy scores by the max entropy score. See Equation 2 below:

$$H(\text{"Name"}) = \frac{-\sum_{i=1}^{N} p(x_i) * \log_2 p(x_i)}{\text{max entropy score}} \qquad (2)$$

where, N is the total number of possible outcomes for the data element "Name"; $p(x_i)$ is the probability of each of the outcomes of data element "Name" occurring; $\Sigma$ denotes the sum over all possible outcomes for data element "Name"; and "max entropy score" is calculated using the equation $-\Sigma_{i=1}^{N} p(x_i) * \log_2 p(x_i)$ where $p(x_i)$ is equal to $1/N$.

The entropy score, H("Name") represents the normalized entropy of the data element Name". As mentioned above, entropy measures the uncertainty or randomness associated with the possible outcomes of a random variable. $p(x_i)$: is the probability of the i-th possible outcome, denoted as $x_i$, for the random variable "Name". Each possible outcome has a corresponding probability. $\log_2(p(x_i))$ is the base-2 logarithm of the probability $p(x_i)$. The logarithm scales the probability and using a base-2 logarithm measures the amount of information in "bits" or "binary digits". $-\Sigma_{i=1}^{N} p(x_i)*\log_2 p(x_i)$ is the summation of the products of each outcome's probability and the logarithm of its probability, all negated. The summation is taken over all possible outcomes (from i=1 to N). Dividing the entropy score by the max entropy score provides an entropy score that is normalized to range from 0 to 1.

In the above example from Table 1, the total number of possible outcomes for the data element "Name" is "5", $p(x_i)$ is ⅕ since each name is unique among the 5 rows of "Name" data, and the max entropy score is calculated using $p(x_i)$ of 1/N where N is 5. Thus, the normalized entropy score of the data element "Name" is: $-(((⅕)*\log_2(⅕)+(⅕)*\log_2(⅕)+(⅕)*\log_2(⅕)+(⅕)*\log_2(⅕)+(⅕)*\log_2(⅕))/(⅕)*\log_2(⅕)=1$.

Once the list of direct identifiers is identified within the structured dataset, the direct identifier detector 204 creates a non-direct identifier structured dataset by removing the list of identified direct identifiers from the structured dataset. In an example embodiment, the resulting non-direct identifier structured dataset is stored in the data store 112 for further use by the quasi-identifier detector 206 as described below. The process of identifying direct identifiers is further described in relation to FIG. 3 and FIG. 4.

The non-direct identifier structured dataset created after removing the direct identifiers from Table 1 is shown below in Table 2.

TABLE 2

| Age | Gender | Weight | Zip Code |
|-----|--------|--------|----------|
| 45  | M      | 72     | 12345    |
| 45  | M      | 72     | 12345    |
| 21  | M      | 58     | 45678    |
| 21  | F      | 45     | 45678    |
| 64  | F      | 45     | 45678    |

The quasi-identifier detector 206 is configured to analyze each data element within the non-direct identifier structured dataset and identify any quasi-identifiers within the non-direct identifier structured dataset. In an example embodiment, once the quasi-identifiers within the non-direct identifier structured dataset are identified, the quasi-identifier detector 206 creates a list of quasi-identifiers that includes all quasi-identifiers identified within the non-direct identifier structured dataset.

Generally, the quasi-identifiers are identified by calculating a combined score based on a combination of the entropy score of the data element and an external influence score for the data element associated with the data element and evaluating whether the calculated combined score is above a certain quasi-identifier threshold value. The external influence score is a measure of the probability of identifying an individual within the dataset after removing at least a subset or particular category of data within the non-direct identifier structured dataset. In other words, the external influence score is a measure of the amount of unique information an element of data within the non-direct identifier structured dataset carries with respect to the other elements of data within the non-direct identifier structured dataset.

For example, in a simple dataset as seen above in Table 1, the 5 elements of data includes: Name, Age, Gender, Weight and ZipCode. In one example, the name would be identified as a direct identifier and removed from the structured dataset. As seen in Table 2, if the first data element ("Name") is removed from the Table 1, the number of unique groups among the remaining elements of data is 4 since the age, gender, weight and zip code together make 4 unique combinations. If the second element of data ("Age") is removed from Table 2, the number of unique groups among the remaining elements of data is 3 since there would be 3 unique combinations of gender, weight and zip code in Table 2. If the fifth data element ("Zip Code") is removed from Table 2, the number of unique groups among the remaining elements of data remains at 4, since there would still be 4 unique combinations of age, gender, and weight in Table 2.

Thus, the ability of the fifth data element ("Zip Code") to form unique groups (subsets) is lower and would result in a lower external influence score for the fifth data element, whereas the ability of the second data element ("Age") to uniquely identify an individual is higher than the fifth data element and would result in a higher external influence score than the external influence score of the first element of data.

The external influence score is calculated based on the Equation 3 below:

$$\text{External influence score}(Y) = 1 - \frac{N_E(T-Y)}{N_E(T)} \quad (3)$$

wherein, Y is the data element whose external influence scores is being calculated, $N_E$ is the number of unique groups that can be formed using the data within the structured dataset, T is the structured dataset and wherein Y can be any of the data elements 1, 2, 3 ... n, wherein n is the total number of data elements within the structured dataset. In other words, $N_E(T-Y)$ is the number of unique groups that could be formed after a particular data element (Y) is removed from the overall structured dataset T; and $N_E(T)$ is the maximum number of unique groups that can exist within the structured dataset T. When calculating the external influence score for the purposes of identifying quasi-direct identifiers, the structured dataset T is one in which the direct identifiers have already been removed. For example, for identifying the quasi-identifiers in the examples provided here, the non-direct identifier structured dataset shown in Table 2 may be used as the "structured dataset T".

For example, in the above example from Table 2, the external influence score for the "Age" data element is 1−(¾) or 0.25, whereas the external influence score for the "Zip Code" data element in Table 2 is 1−(4/4) or 0.

In an example embodiment, once the list of quasi-identifiers is identified within the structured dataset, the quasi-identifier detector 206 creates a non-quasi-identifier structured dataset by removing the list of identified quasi-identifiers from the non-direct identifier structured dataset. The resulting non-quasi-identifier structured dataset is stored in the data store 112 for further use by the unique value detector 208 as described below. The process of identifying quasi-identifiers is further described in relation to FIG. 3, FIG. 4, and FIG. 5.

The unique value detector 208 is configured to analyze the data elements within the non-quasi-identifier structured dataset and identify any unique values within the non-quasi-identifier structured dataset. Unique values are values of data elements that are unique enough within a dataset that it is becomes obvious or highly likely that it is associated with a particular individual. For example, gender can contain a unique value if, within an organization of 100 individuals, there are 99 employees that identify as male, and 1 employee that identifies as female. Thus, although gender is not typically be considered to include PII, in particular cases, it can contain a unique value that includes PII depending on the values within non-quasi-identifier structured dataset itself. In an example embodiment, once the unique value detector 208 identifies the unique values within the non-quasi-identifier structured dataset, the unique value detector 208 creates a list of unique values that includes all unique values identified within the non-quasi-identifier structured dataset.

Generally, the unique values are identified by calculating an internal influence score and evaluating whether the calculated internal influence score is above a certain unique value threshold value. The internal influence score is calculated based on a normalized unique value count for each element of data within the non-quasi-identifier structured data set. The unique value count of a data element is the number of values within the data element that is unique. Upon determining the unique value count of an element of data, the internal influence score can be calculated by normalizing the unique value count value using the Equation 4 below:

Internal Influence score of a value in an element of data=Unique value count of the value in an element of data  (4)

Wherein, if the unique value count of the value in an element of data is less than or equal to "n", then the internal influence score is "1", where "n" is a threshold of number of unique value count.

For an example dataset as shown below in Table 2 above, the unique value count for the "Gender" value of "F" is 1 since there is only 1 unique value ("F") among the 4 total data elements. If the internal influence score is 1, then "F" is considered a unique value. The process of identifying unique values is further described in relation to FIGS. 3 and 6.

The PII transformer 210 is configured to transform the identified direct identifiers, quasi-identifiers and unique values into de-identifiable values by applying specific transformation rules based on the data type and a category type. A category type includes a database identifier and a non-database identifier. Database identifiers, as used herein, generally refer to data elements within a dataset that have a relationship with other data elements within the same dataset or a related dataset such that any transformation rules must preserve the both the integrity of the underlying data, as well as the relationship between the data elements within the datasets.

The specific transformation rules assist in maintaining the integrity of the data, such that the underlying data can still be used for the research and analytical purposes without disclosing any PII. For example, a birthdate can be transformed into another date value such that the underlying data still includes a date value. A list of transformation rules based on the data type and whether the value is a database identification value or not is detailed in Table 3 below.

TABLE 3

| Identifiers | Data type | Category | Type of Transformation |
|---|---|---|---|
| Direct Identifiers | Numeric | Database ID | Numerical Offset |
| | | Non-database ID | Binning or Generalization |
| | String | Database ID | Format Preserving Encryption |
| | | Non-database ID | Format Preserving Encryption |
| | Date/time | Database ID | Date Offset |
| | | Non-database ID | Binning or Generalization |
| Quasi-Identifiers | Numeric | Database ID | Numerical Offset |
| | | Non-database ID | Binning or Generalization |
| | String | Database ID | Format Preserving Encryption |
| | | Non-database ID | Categorize or Anonymize |
| | Date/time | Database ID | Date Offset |
| | | Non-database ID | Binning or Generalization |
| Unique Values | Numeric | Database ID | Generalization or Categorize |
| | String | Non-database ID | |
| | Date/Time | | |

When the data element is identified to be a direct identifier, the PII transformer 210 determines whether the data element includes a numeric, string or data/time value. The PII transformer 210 also determines whether the category of the data element includes a database identifier or a non-database identifier. Based on a combination of those two determinations, the PII transformer 210 applies a specific transformation rule to the data element.

In an example embodiment, for numerical data types that are also identified to be within a database identifier category, a numeric offset transformation rule is applied to the numerical value in order to transform the numerical value to be de-identifiable of PII. A numerical offset transformation rule includes adding or subtracting a constant value to the numerical value in order to transform the numerical value to a de-identifiable numerical value.

In an example embodiment, for numerical data types that are also identified to be within a non-database identifier category, a binning or generalization transformation rule is applied to the numerical value in order to transform the numerical value to be de-identifiable of PII. Binning refers to the process of dividing a continuous variable into a set of distinct intervals or groups known as bins. Each bin represents a range of values and data points falling within the range can be assigned that particular value. Bin sizes can be determined dynamically based on the distribution of data values within the data element such that the binning transformation creates a particular distribution of the transformed data values, such as a bell-shaped curve or an even distribution. In an example, bin size may be determined using Equation 5

$$\text{Bin width} = 2\frac{IQR(x)}{\sqrt[3]{n}}, \quad (5)$$

Wherein, IQR(x) is the interquartile range of the variable x and n is the number of variables in x. The IQR is the difference between the $75^{th}$ and $25^{th}$ percentile of data. In an example, for 10 people with salary information as provided below in Table 4, the $25^{th}$ percentile of data is 44617.21 and the $75^{th}$ percentile of data is 74069.07, the IQR value is 29451.85. Since the number of people in this example is 10, the value of n is 10. On substituting the values into the Equation 5 we arrive with the number 27,340.

In an example, for 10 people with salary information as provided below in Table 4, applying a binning transformation rule with bid widths calculated using Equation 5 above creates bins with $27,340 increments.

TABLE 4

| Person Number | Salary | Salary Bin |
| --- | --- | --- |
| 1 | 84189.71 | 82022.04 |
| 2 | 87894.37 | 82022.04 |
| 3 | 50456.90 | 54681.36 |
| 4 | 75012.11 | 82022.04 |
| 5 | 42616.39 | 54681.36 |
| 6 | 43536.65 | 54681.36 |
| 7 | 56326.36 | 54681.36 |
| 8 | 71239.94 | 82022.04 |
| 9 | 47858.90 | 54681.36 |
| 10 | 43171.99 | 54681.36 |

For the example from Table 10, bin ranges with the bin size of 27,340 is created and each of the salaries may be placed in a bin within which it falls. When binning transformation rules are applied to the salary numerical values, all salary values that fall between $0 and $27,340 is transformed into $27,340; all salary values that fall between $27,340 and $54,681 is transformed into $54,681; all salary values that fall between $54,681.36 and $82,022 is transformed into $82,022. After the application of the transformation rules, the salary value for person 1 is $82,022 for person 2 is $82,022, person 3 is $54,681, person 4 is $82,022 and so on.

Generalization refers to the process of reducing the level of detail or granularity in data while retaining its essential patterns or characteristics. For example, when performing a binning transformation, if multiple bins only include single data values, the effectiveness of the de-identification is reduced. In such cases, a generalization transformation rule is applied to combine multiple bins into the same bin in order to reduce the risk of re-identification the underlying data value. Other ways of applying generalization rules are also possible.

In an example embodiment, for string data types that are also identified to be either within a database identifier category or a non-database identifier category, a format preserving encryption transformation rule is applied to the string value in order to transform the string value to be de-identifiable of PU. For example, the format preserving encryption transformation rule refers to a method that encrypts string data into an encrypted string data while maintaining the original format and length of the string data.

In some other examples, a format preserving hashing transformation rule can instead be applied to string values in order to transform the string value to be de-identifiable of PII. The format preserving hashing transformation rule includes applying a hashing algorithm to the string data to transform the string data into a transformed string data that is of the same length as the input string value or of a predetermining length. In some example embodiments, the hashing algorithm itself differs between different structured datasets or even between different data elements within the same structured dataset. In other example embodiments, the hashing algorithm between the different datasets or between the different data elements within the same structured dataset is the same.

In an example embodiment, for date/time data types that are also identified to be within a database identifier category, a date/time offset transformation rule is applied to the data/time value in order to transform the date/time value to be de-identifiable of PII. For example, the date/time offset transformation rule refers to applying a constant offset value, such as constant number of days, to a date/time value such that the original date value is transformed into another date value while still preserving the integrity of the data value and the relationship between the data values within the dataset.

In an example embodiment, for date/time data types that are also identified to be within a non-database identifier category, a binning and/or generalization transformation rule is applied to the data/time value in order to transform the date/time value to be de-identifiable of PII.

When the data element is identified to be a quasi-identifier, the PII transformer 210 determines whether the data element includes a numeric, string or data/time value. The PII transformer 210 also determines whether the data element is within a database identifier category or a non-database identifier category. Based on a combination of those two determinations, the PII transformer 210 applies a specific transformation rule to the data element.

In an example embodiment, for numerical data types that are also identified to be within a database identifier category, a numeric offset transformation rule is applied to the numerical value. In an example embodiment, for numerical data types that are also identified to be within a non-database identifier category, a binning and/or generalization transformation rule is applied to the numerical value. In an example embodiment, for string data types that are also identified to be within the database identifier category, a format preserving encryption transformation rule is applied to the string value. In an example embodiment, for string data types that are also identified to be within the non-database identifier category, a categorize/anonymize rule is applied to the string value. Categorization/anonymization refers to the process of converting data values into discrete categories or groups. In an example embodiment, for a date/time data types that are also identified to be within the database identifier category, a date/time offset transformation rule is applied to the data/time value. In an example embodiment, for a date/time data types that are also identified to be within the non-database identifier category, a binning and/or generalization transformation rule is applied to the data/time value.

When the data element is identified to contain a unique value, the PII transformer 210 applies specific transformation rules to the data element. In an example embodiment, for numerical, string or date/time data values that are also identified to be within database or non-database identifier categories, a generalization or categorization transformation rule is applied to the underlying unique values in order transform the unique values to data values that are de-identifiable of PII. In some examples, the transformation rule may include simply grouping the unique value with a data element or subset or category that is the most populous. Other ways of de-identifying unique values is also possible.

The PII transformer 210 creates a de-identified structured data by replacing the identified direct identifiers, quasi-identifiers and unique values within the structured data with the transformed data elements.

The PII re-identification risk assessor 212 is configured to assess the risk of re-identification of PII after the structured dataset has already been transformed by the PII transformer 210 into the de-identified structured. The PII re-identification risk assessor 212 generates a probability of re-identification score for the de-identified structured dataset. The PII re-identification risk assessor 212 also generates a re-identification score for the original, untransformed structured dataset to use as a measurable comparison.

The probability of re-identification can be calculated based on Equation 6 below:

$$\text{Probability of re-identification score} = \frac{1}{\text{Size of equivalence class}} \quad (6)$$

where, the equivalence class refers to the number of unique groups of data that can be created within the de-identified dataset upon removal of the direct identifiers from the de-identified dataset. For example, the equivalence class refers to all rows in the de-identified dataset with the same values for data elements that are quasi-identifiers.

If the probability of re-identification score for the de-identified structured dataset is not over a threshold value, the de-identification process (as performed by the PII identifier 202 and the PII transformer 210) can be repeated again with updated threshold values for the quasi-identifier threshold value. This allows for data that was not previously determined to be quasi-identifiers to now be determined to be quasi-identifiers and go through a de-identification transformation to create an updated de-identified structured dataset that is even more robust against re-identification of PII. The threshold value is changed based on the type of data included within the de-identified structured dataset. For example, de-identified structured datasets that can potentially be released publicly or partially released publicly includes a higher threshold value that the threshold value for the structured datasets that only include internal non-public data.

The de-identification process can be repeated more than once based on whether the probability of re-identification score meets a predetermined threshold level of improvement. By repeating the de-identification process with updated threshold values, the overall effectiveness of the data de-identification system 100 is improved and the risk of re-identification of PII within the structured dataset is lowered.

Figure 3:
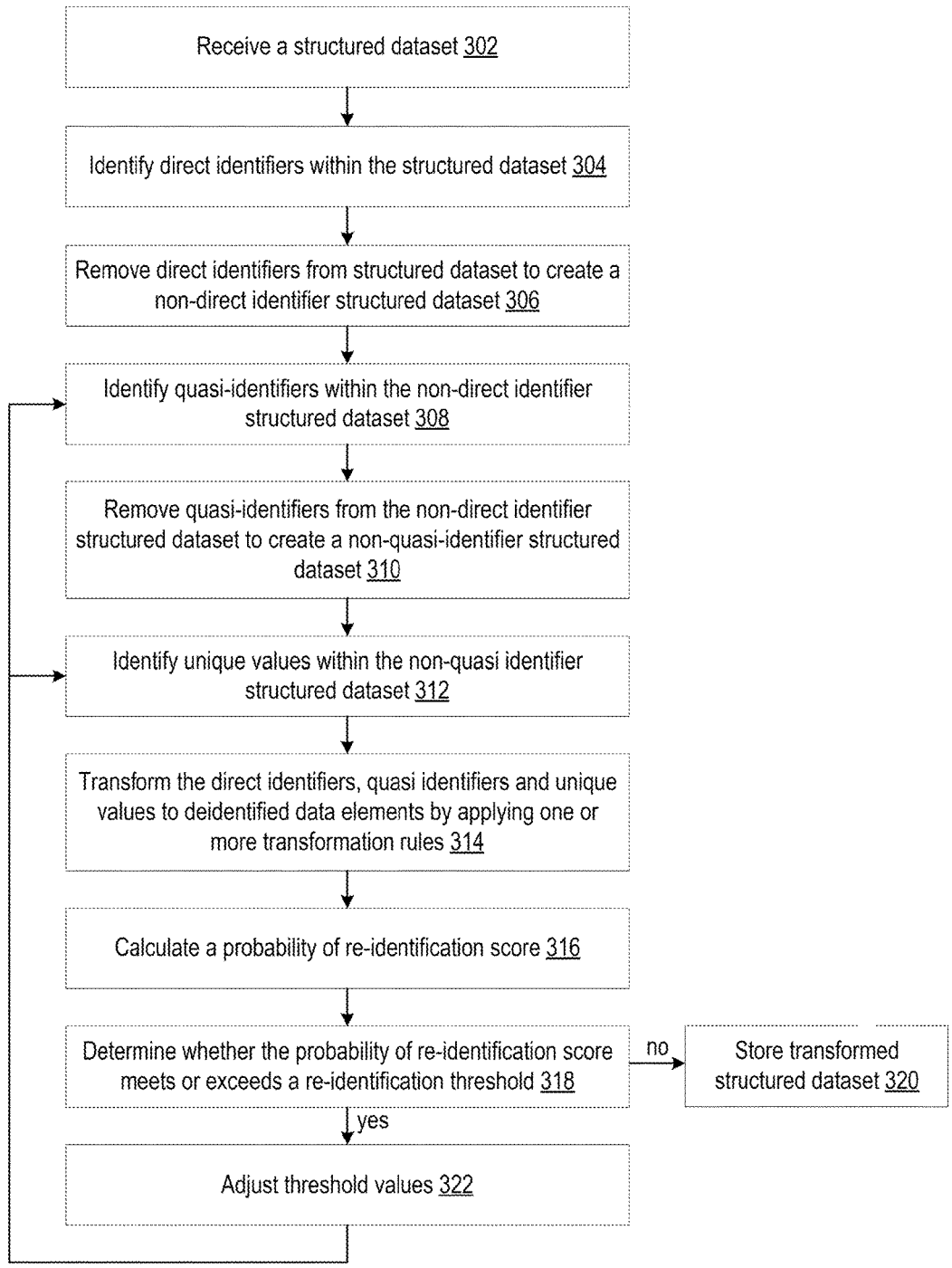
FIG. 3 illustrates a flowchart of a method for de-identifying PII as performed by a data de-identification tool, according to an example embodiment.

FIG. 3 illustrates a flowchart of a method for de-identifying PII as performed by the data de-identification tool 110 of FIG. 1, according to an example. The example method 300 includes operation 302-operation 312 that are performed by the data de-identification tool 110 implemented on the server electronic computing device 108.

At operation 302, the PII identifier 202 of the data de-identification tool 110 receives a structured dataset from the data store 112, initiating the process to de-identify PII within the structured dataset. In some examples, the de-identification process is initiated upon the data de-identification tool 110 receiving a user input from the user via the user interface 104.

For example, the structured dataset can include a structured query language (SQL) database with a plurality of data elements stored within a plurality of data elements and rows. In some examples, the database is a relational database, where the data elements are related to one another. Other types of structured dataset are also possible.

At operation 304, the direct identifier detector 204 of the PII identifier 202 identifies direct identifiers within the structured dataset. Direct identifiers are the data elements within the structured dataset that directly identify an individual person without requiring any other additional information. Examples of direct identifiers include name, address, government identifiers, social security number, phone numbers, etc.

To identify direct identifiers, the direct identifier detector 204 calculates an aggregate entropy score for each of the plurality of data elements within the structured dataset. The direct identifier detector 204 compares the calculated aggregate entropy score to a direct identifier threshold score.

In some examples, the direct identifier detector 204 receives a predetermined, pre-stored direct identifier threshold value from the data store 112. In an example embodiment, the predetermined, pre-stored direct identifier threshold value is a user calculated value that is particular to the data within the structured dataset. In some examples, the direct identifier threshold value can be input by a user via the user interface 104 and stored in the data store 112. In other examples, the direct identifier threshold value can also be automatically calculated by balancing the need to maintain the integrity of the underlying data and the relationships between the data while reducing the risk of re-identification of any PII within the underlying data. The process of identifying the direct identifiers is further described in greater detail in relation to FIGS. 2 and 4.

At operation 306, the direct identifier detector 204 of the PII identifier 202 removes the identified direct identifiers from the structured dataset to create a non-direct identifier structured dataset that includes all elements from the structured dataset except the identified direct identifiers. In some examples, the identified direct identifiers are added to a list of direct identifiers and stored in the data store 112 that is used by the PII transformer during the de-identification and transformation process.

At operation 308, the quasi-identifier detector 206 of the PII identifier 202 identifies quasi-identifiers within the non-direct identifier structured dataset. In some examples, the quasi-identifier detector 206 first retrieves the non-direct identifier structured dataset from the data store 112 before identifying the quasi-identifiers. Quasi-identifiers are data elements that do not directly identify an individual but can identify an individual when combined with an additional piece of information.

To identify quasi-identifiers, the quasi-identifier detector 206 calculates a combined score for each of the plurality of data elements within the non-direct identifier structured dataset. The combined score is calculated by averaging the previously calculated aggregate entropy score for the element of data and the external influence score. The quasi-identifier detector 206 compares the calculated combined score to a quasi-identifier threshold score.

In some examples, the quasi-identifier detector 206 receives a predetermined, pre-stored quasi-identifier threshold value from the data store 112. In an example embodiment, the predetermined, pre-stored quasi-identifier threshold value is a user calculated value that is particular to the data within the non-direct identifier structured dataset. In some examples, the quasi-identifier threshold value can be input by a user via the user interface 104 and stored in the data store 112. In other examples, the quasi-identifier threshold value can also be automatically calculated by balancing the need to maintain the integrity of the underlying data and the relationships between the data while reducing the risk of re-identification of any PII within the underlying data. The process of identifying the quasi-identifiers is further described in greater detail in relation to FIGS. 2 and 5.

At operation 310, the quasi-identifier detector 206 of the PII identifier 202 removes the identified quasi-identifiers from the non-direct identifier structured dataset to create a non-quasi-identifier structured dataset that includes all elements from the non-direct identifier structured dataset except the identified quasi-identifiers. In some examples, the identified quasi-identifiers are added to a list of quasi-identifiers and stored in the data store 112 that is used by the PII transformer during the de-identification and transformation process.

At operation 312, the unique value detector 208 of the PII identifier 202 identifies unique values within the non-quasi-identifier structured dataset. In some examples, the unique value detector 208 first retrieves the non-quasi-identifier structured dataset from the data store 112 before identifying the unique values. Unique values are values of data elements that are unique enough within a dataset that it is becomes obvious or highly likely that it is associated with a particular individual.

To identify unique values, the unique value detector 208 calculates an internal influence score for each of the plurality of values of data elements of data within the non-quasi-identifier structured dataset 310. The unique value detector 208 compares the calculated internal influence score to a unique value threshold score.

In some examples, the unique value detector 208 receives a pre-determined, pre-stored unique value threshold value from the data store 112. In an example embodiment, the predetermined, pre-stored unique value threshold value is a user calculated value that is particular to the data within the non-quasi-identifier structured dataset. In some examples, the unique value threshold value can be input by a user via the user interface 104 and stored in the data store 112. In other examples, the unique value threshold value can be calculated by balancing the need to maintain the integrity of the underlying data and the relationships between the data while reducing the risk of re-identification of any PII within the underlying data. The process of identifying the unique values is further described in greater detail in relation to FIGS. 2 and 6.

At operation 314, the PII transformer 210 of the data de-identification tool 110 transforms the identified direct identifiers, quasi-identifiers and unique values from operations 304, 308, and 312 into de-identified data elements by applying one or more data specific transformation rules. The PII transformer 210 then creates a transformed structured dataset by replacing the direct identifiers, quasi-identifiers and unique values within the structured dataset with the transformed data elements. The process of transforming the direct identifiers, quasi-identifiers and unique values is further described in greater detail in relation to FIGS. 2 and 7.

At operation 316, the PII re-identification risk assessor 212 of the data de-identification tool 110 calculates a probability of re-identification score for the transformed structured dataset created by the PII transformer 210 in operation 314. The probability of re-identification score is a numerical value that provides the likelihood that PII can be discerned from the transformed structured dataset. In an example embodiment, the probability of re-identification score is calculated using Equation 6 above based on the number of unique groups of data that can be created within the structured dataset upon removal of the direct identifiers from the structured dataset.

At operation 318, the PII re-identification risk assessor 212 of the data de-identification tool 110 compares the probability of re-identification score to a re-identification threshold value and determines whether the probability of re-identification score exceeds the re-identification threshold value.

In some examples, the PII re-identification risk assessor 212 receives a predetermined, pre-stored re-identification threshold value from the data store 112. In an example embodiment, the predetermined, pre-stored re-identification threshold value is a user calculated value that may be particular to the data within the transformed structured dataset. In some examples, the re-identification threshold value can be input by a user via the user interface 104 and stored in the data store 112. In other examples, the re-identification threshold value can also be automatically calculated by balancing the need to maintain the integrity of the underlying data and the relationships between the data while reducing the risk of re-identification of any PII within the underlying data. The re-identification threshold varies based on the type of data included within the transformed structured dataset. For example, for data that can potentially be fully or partially published to the public, the re-identification threshold is higher than for data that is not be published to the public and is only used internally within an organization.

Upon determining that the probability of re-identification score does not exceed the re-identification threshold value, the PII re-identification risk assessor 212 is configured to proceed to operation 320. Alternatively, upon determining that the probability of re-identification score meets or exceeds the re-identification threshold value, the PII re-identification risk assessor 212 is configured to proceed to operation 322.

At operation 320, the PII re-identification risk assessor 212 of the data de-identification tool 110 stores the transformed structured dataset in the data store 112, wherein the transformed structured dataset includes de-identified data that can now be used for research and analytics with acceptable levels of risk of re-identification of PII. Operation 320 also concludes the process of de-identification of PII within the structured data.

At operation 322, the PII re-identification risk assessor 212 of the data de-identification tool 110 adjusts the quasi-identifier threshold value before proceeding to operation 308. For example, when the probability of re-identification score meets or exceeds the re-identification threshold value, it means that the risk of re-identification of PII within the transformed structured dataset is still too high to be acceptable by the organization handing the structured dataset. In an example embodiment, to catch additional data elements that could potentially qualify as quasi-identifiers, the quasi-identifier threshold value is lowered. In some examples, the PII re-identification risk assessor 212 of the data de-identification tool 110 may adjust the quasi-identifier threshold value automatically based on calculated risk of re-deidentification of PII. In other examples, the PII re-identification risk assessor 212 of the data de-identification tool 110 may adjust the quasi-identifier threshold value manually based on a threshold value entered by a user.

In some examples, in addition to or instead of re-adjusting the quasi-identifier threshold value, the PII re-identification risk assessor 212 may re-adjust the the unique value threshold value in order to identify additional values of data elements that can potentially qualify as unique values. In some examples, the PII re-identification risk assessor 212 of the data de-identification tool 110 may adjust the unique value threshold value automatically based on calculated risk of re-deidentification of PII. In other examples, the PII re-identification risk assessor 212 of the data de-identification tool 110 may adjust the unique value threshold value manually based on a threshold value entered by a user.

Upon lowering the quasi-identifier threshold value and/or the unique value threshold value, the PII re-identification risk assessor 212 is configured to proceed to operation 308 or operation 312. In cases where the quasi-identifier threshold value and the unique value threshold value are both re-adjusted, the data de-identification tool 110 proceeds to repeat operations 308-318 until operation 318 proceeds to operation 320. In cases where only the unique value threshold value is re-adjusted, the data de-identification tool 110 proceeds to repeat operations 312-318 until operation 318 proceeds to operation 320.

Figure 4:
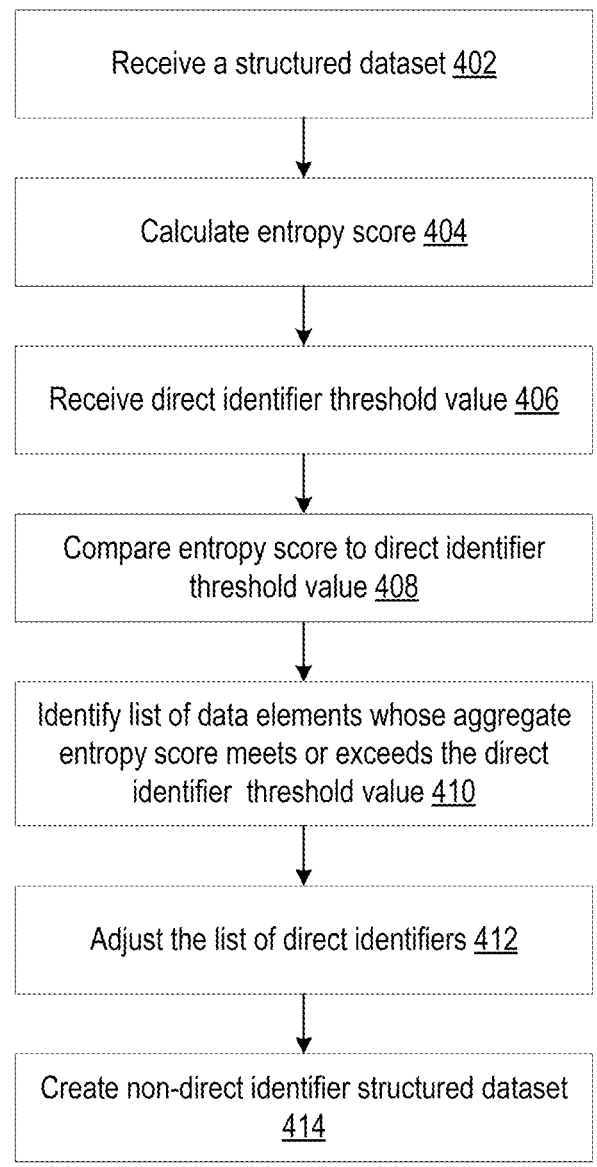
FIG. 4 illustrates a flowchart of a method for identifying direct identifiers as performed by a data de-identification tool, according to an example embodiment.

FIG. 4 illustrates a flowchart of a method for identifying direct identifiers as performed by the data de-identification tool 110 of FIG. 1, according to an example. The example method 400 includes operation 402-operation 414 that are performed by the data de-identification tool 110 implemented on the server electronic computing device 108.

At operation 402, the direct identifier detector 204 of the data de-identification tool 110 receives the structured dataset from the data store 112 to begin the process of de-identification of PII within the structured dataset. In an example embodiment, the structured dataset includes a plurality of data elements and rows of data elements. In some examples, the structured dataset is a relational dataset where the data elements have a relationship to other data elements within the structured dataset.

At operation 404, the direct identifier detector 204 of the data de-identification tool 110 calculates the entropy score for each element of data within the structured dataset. The entropy score for each element of data within the structured dataset is an aggregate of the entropy scores of each value of a data element.

The entropy score of a value of a data element can be calculated based on the uniqueness or randomness of the value of the data element within the structured dataset, as further described above in FIG. 2 and Equation 1.

At operation 406, the direct identifier detector 204 of the data de-identification tool 110 receives a direct identifier threshold value from the data store 112. The direct identifier threshold value can be input via the user interface 104 or automatically calculated by balancing the need to maintain the integrity of the underlying data and the relationships between the data while reducing the risk of re-identification of any PII within the underlying data.

At operation 408, the direct identifier detector 204 of the data de-identification tool 110 compares the aggregate entropy score associated with each element of data within the structured dataset and as calculated in operation 404 to the direct identifier threshold value as received in operation 406 to determine whether the aggregate entropy score meets or exceeds the direct identifier threshold value.

At operation 410, the direct identifier detector 204 of the data de-identification tool 110 identifies a list of data elements whose aggregate entropy score meets or exceeds the direct identifier threshold value. The identified list of data elements is considered to include direct identifiers requiring a de-identification transformation that minimizes the risk of identification of PII.

At operation 412, the direct identifier detector 204 of the data de-identification tool 110 adjusts the list of direct identifiers identified in operation 410. For example, the list of direct identifiers, as identified in operation 410, is displayed on the user interface 104 for user review and approval. The user, upon review of the displayed list of direct identifiers via the user interface, can adjust the list by adding or removing certain elements within the list. In some examples, the list of direct identifiers is adjusted according to the user input and stored in the data store 112 for further de-identification processing as described in relation to FIGS. 2-3.

At operation 414, the direct identifier detector 204 of the data de-identification tool 110 creates a non-direct identifier structured dataset by removing the list of direct identifiers from the structured dataset. The created non-direct identifier structured dataset is stored in the data store 112. The non-direct identifier structured dataset is used by the quasi-identifier detector 206 in the identification of quasi-identifiers, as further described in relation to FIG. 5.

Figure 5:
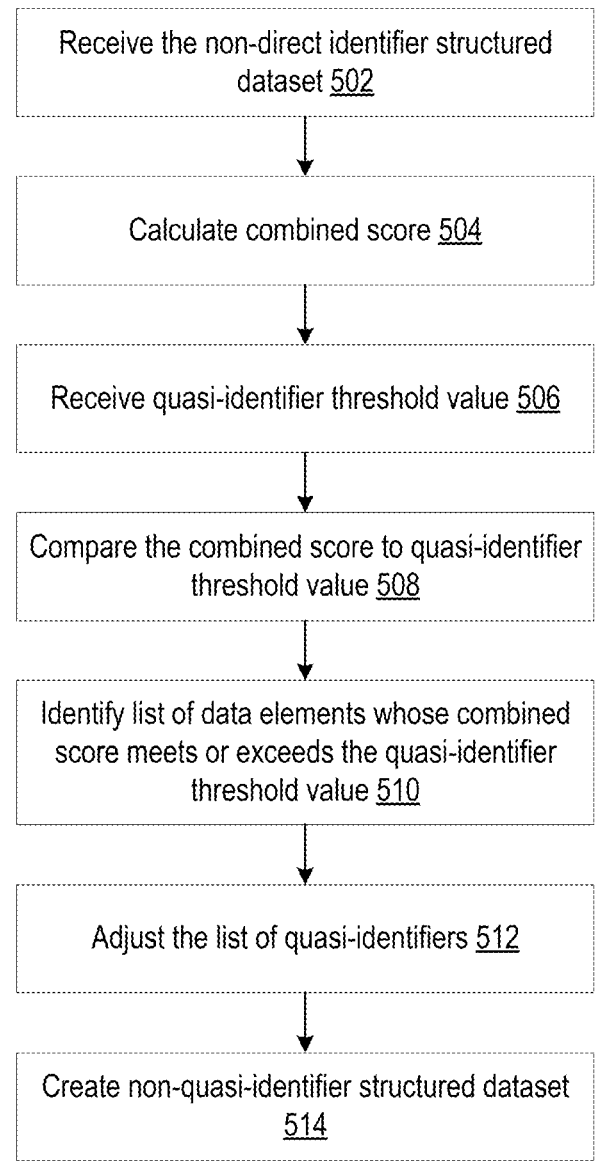
FIG. 5 illustrates a flowchart of a method for identifying quasi-identifiers as performed by a data de-identification tool, according to an example embodiment.

FIG. 5 illustrates a flowchart of a method for identifying quasi-identifiers as performed by the data de-identification tool 110 of FIG. 1, according to an example. The example method 500 includes operation 502-operation 514 that are performed by the data de-identification tool 110 implemented on the server electronic computing device 108.

At operation 502, the quasi-identifier detector 206 of the data de-identification tool 110 receives a non-direct identifier structured dataset from the data store 112. In an example embodiment, the non-direct identifier structured dataset includes a plurality of data elements and rows of data elements with the exception of the identified direct identifiers.

At operation 504, the quasi-identifier detector 206 of the data de-identification tool 110 calculates a combined score by combining the entropy score and an external influence score for each element of data within the non-direct identifier structured dataset. The entropy score for each element of data within the structured dataset is an aggregate of the entropy scores of each data element within the element of data as further described in relation to operation 404. In some examples, the entropy scores calculated during operation 404 are re-used.

The external influence score is a measure of the probability of identifying an individual person using the data within the dataset after removing at least a subset or particular element of data within the non-direct identifier structured dataset. The external influence score of an element of data can be calculated based on the number of unique groups that exist after that particular element of data is removed from the non-direct identifier structured dataset, as further described above in FIG. 2 and Equation 3.

At operation 506, the quasi-identifier detector 206 of the data de-identification tool 110 receives a quasi-identifier threshold value from the data store 112. The quasi-identifier threshold value can be input via the user interface 104 or automatically calculated by balancing the need to maintain the integrity of the underlying data and the relationships between the data while reducing the risk of re-identification of any PII within the underlying data.

At operation 508, the quasi-identifier detector 206 of the data de-identification tool 110 compares the combined score associated with each element of data within the non-direct identifier structured dataset and as calculated in operation 504 to the quasi-identifier threshold value as received in operation 506 to determine whether the combined score meets or exceeds the quasi-identifier threshold value.

At operation 510, the quasi-identifier detector 206 of the data de-identification tool 110 identifies a list of data elements whose combined score meets or exceeds the quasi-identifier threshold value. The identified list of data elements is considered to include quasi-identifiers requiring a de-identification transformation that minimizes the risk of identification of PII.

At operation 512, the quasi-identifier detector 206 of the data de-identification tool 110 adjusts the list of quasi-identifiers identified in operation 510. For example, the list of quasi-identifiers, as identified in operation 510, is displayed on the user interface 104 for user review and approval. The user, upon review of the displayed list of quasi-identifiers via the user interface, can adjust the list by adding or removing certain elements within the list. The list of quasi-identifiers is adjusted according to the user input and stored in the data store 112 for further de-identification processing as described in relation to FIGS. 2-3.

At operation 514, the quasi-identifier detector 206 of the data de-identification tool 110 creates a non-quasi-identifier structured dataset by removing the list of quasi-identifiers from the non-direct identifier structured dataset. The created non-quasi-identifier structured dataset is stored in the data store 112. The non-quasi-identifier structured dataset is used by the unique value detector 208 in the identification of unique values, as further described in relation to FIG. 6.

Figure 6:
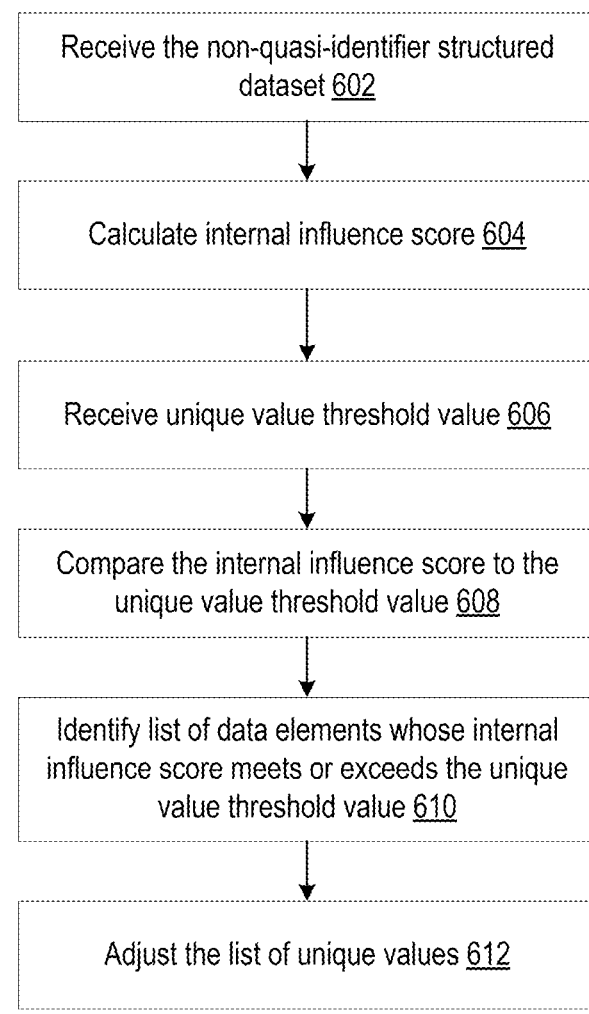
FIG. 6 illustrates a flowchart of a method for identifying unique values as performed by a data de-identification tool, according to an example embodiment.

FIG. 6 illustrates a flowchart of a method for identifying unique values as performed by the data de-identification tool 110 of FIG. 1, according to an example. The example method 600 includes operation 602-operation 612 that are performed by the data de-identification tool 110 implemented on the server electronic computing device 108.

At operation 602, the quasi-identifier detector 206 of the data de-identification tool 110 receives a non-quasi-identifier structured dataset from the data store 112. In an example embodiment, the non-quasi-identifier structured dataset includes a plurality of data elements and rows of data elements with the exception of the identified direct identifiers and quasi-identifiers.

At operation 604, the unique value detector 208 of the data de-identification tool 110 calculates an internal influence score. The internal influence scores identify any unique values within a data element of a dataset that makes identification of PII easier. The internal influence score is calculated based on the unique value count of the value in a data element, as further described above in FIG. 2 and Equation 4.

At operation 606, the unique value identifier detector 208 of the data de-identification tool 110 receives a unique value threshold value from the data store 112. The unique value threshold value can be input via the user interface 104 or automatically calculated by balancing the need to maintain the integrity of the underlying data and the relationships between the data while reducing the risk of re-identification of any PII within the underlying data.

At operation 608, the unique value detector 208 of the data de-identification tool 110 compares the internal influence score associated with each value of a data element of data within the non-quasi-identifier structured dataset and as calculated in operation 504 to the unique value threshold value as received in operation 606 to determine whether the internal influence score meets or exceeds the unique value threshold value.

At operation 610, the unique value detector 208 of the data de-identification tool 110 identifies a list of data elements and corresponding values/subcategories/outcomes whose internal influence score meets or exceeds the unique value threshold value. The identified list of data elements is considered to include unique values requiring a de-identification transformation that minimizes the risk of identification of PII.

At operation 612, the unique value detector 208 of the data de-identification tool 110 adjusts the list of unique values identified in operation 610. For example, the list of unique values, as identified in operation 610, is displayed on the user interface 104 for user review and approval. The user, upon review of the displayed list of unique values via the user interface, can adjust the list by adding or removing certain elements within the list. The list of unique values is adjusted according to the user input and stored in the data store 112 for further de-identification processing as described in relation to FIGS. 2-3.

Figure 7:
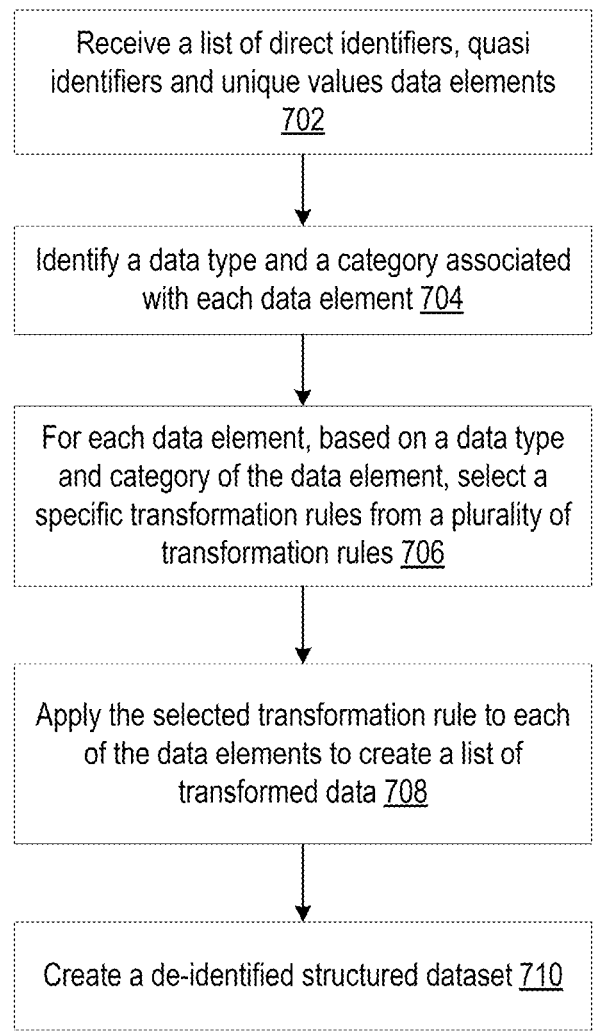
FIG. 7 illustrates a flowchart of a method for transforming identified direct identifiers, quasi-identifiers and unique values into de-identifiable data values as performed by a data de-identification tool, according to an example embodiment.

FIG. 7 illustrates a flowchart of a method for transforming identified direct identifiers, quasi-identifiers and unique values into de-identifiable data values as performed by the data de-identification tool 110 of FIG. 1, according to an example. The example method 700 includes operation 702-operation 714 that are performed by the data de-identification tool 110 implemented on the server electronic computing device 108.

At operation 702, the PII transformer 210 of the data de-identification tool 110 receives the structured dataset and the list of identified direct identifiers, quasi-identifiers and unique values from the data store 112. In some examples, the list of direct identifiers, quasi-identifiers and unique values are identified by the PII identifier 202 in accordance with methods 400-600 described above and stored in the data store 112.

At operation 704, the PII transformer 210 of the data de-identification tool 110, for each of the data elements within the list of direct identifiers, quasi-identifiers and unique values, identifies a data type of the data element and determine whether the data element is within a database identifier category. In an example embodiment, the data type includes: a numerical value, a string value, a date/time value, etc. The database identifier category includes data elements that have relationships to other data elements within the dataset such that any transformation of such data values needs to preserve the integrity of the relationship between the data elements.

At operation 706, the PII transformer 210 of the data de-identification tool 110, for each data element within the list of direct identifiers, quasi-identifiers and unique values, selects a specific transformation rule from a plurality of transformation rule. In some examples, the transformation rules applied to a data element are selected based on the data type of the data element and the category of the data element. The selection process and the different types of transformation rules that are applied to different types of data is described further in relation to FIG. 2 and Table 3 above.

At operation 708, the PII transformer 210 of the data de-identification tool 110 applies the selected transformation rule to each of the data elements within the list of direct identifiers, quasi-identifiers and unique values to create a list of transformed data elements.

At operation 710, the PII transformer 210 of the data de-identification tool 110 creates a de-identified structured data by replacing the identified direct identifiers, quasi-identifiers and unique values within the structured data with the transformed data elements from operation 708. The de-identified structured data is finalized after being adjusted iteratively based on a calculated probability re-identification score as further described in FIG. 2 and operation 316-operation 322 of FIG. 3.

Figure 8:
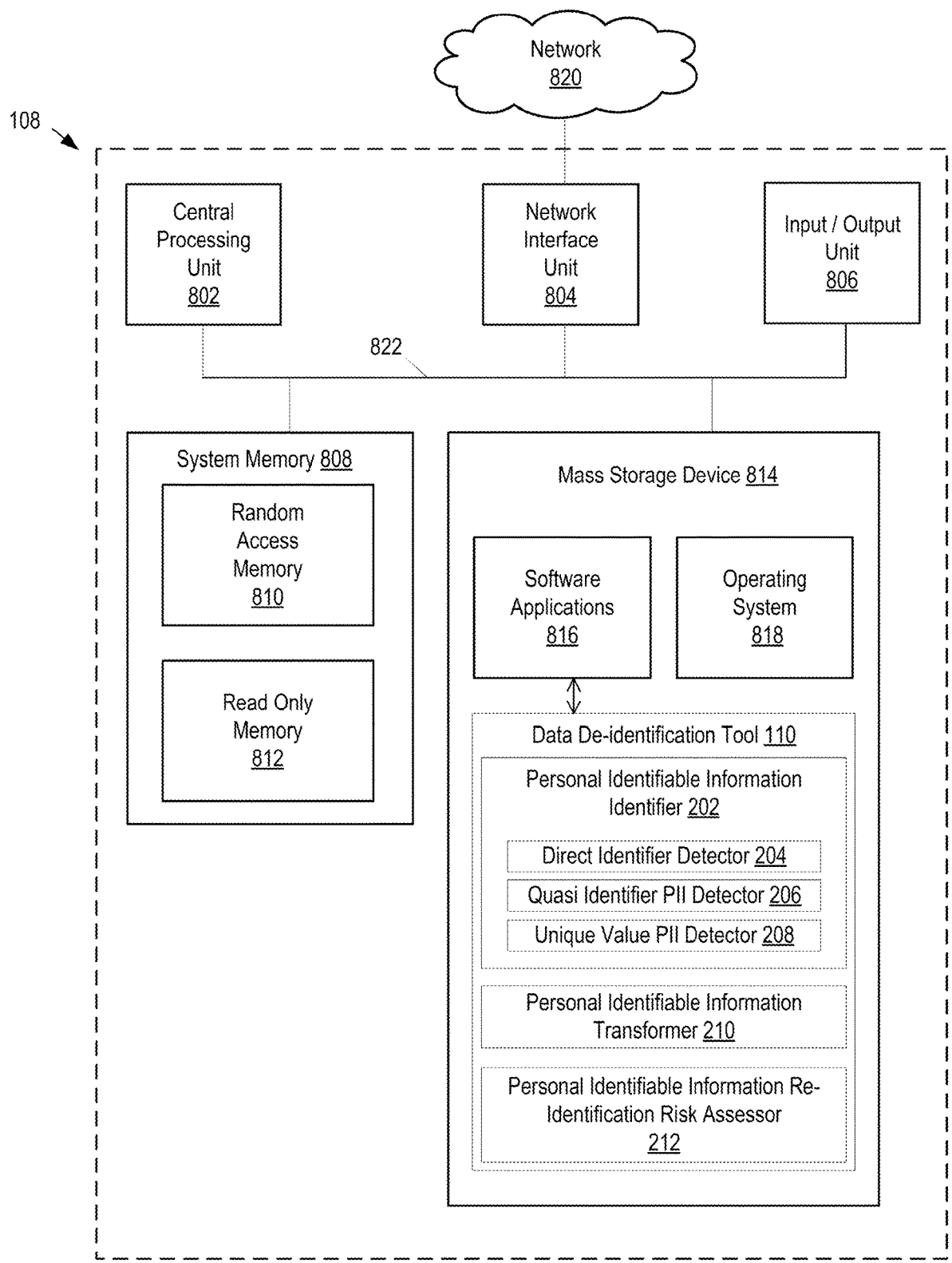
FIG. 8 illustrates example physical components of the electronic computing devices, according to an example embodiment.

As illustrated in the example of FIG. 8, server electronic computing device 108 includes at least one central processing unit ("CPU") 802, a system memory 808, and a system bus 822 that couples the system memory 808 to the CPU 802. The system memory 808 includes a random-access memory ("RAM") 810 and a read-only memory ("ROM") 812. A basic input/output system that contains the basic routines that help to transfer information between elements within the server electronic computing device 108, such as during startup, is stored in the ROM 812. The server electronic computing device 108 further includes a mass storage device 814. The mass storage device 814 is able to store software instructions and data, including software applications 816 and an operating system 818. Some or all of the components of the server electronic computing device 108 can also be included in user electronic computing device 102. Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

The mass storage device 814 is connected to the CPU 802 through a mass storage controller (not shown) connected to the system bus 822. The mass storage device 814 and its associated computer-readable data storage media provide non-volatile, non-transitory storage for the server electronic computing device 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the user electronic computing device 102.

According to various embodiments of the invention, the server electronic computing device 108 operate in a networked environment using logical connections to remote network devices through the network 106, such as a wireless network, the Internet, or another type of network. The server electronic computing device 108 connects to the network 106 through a network interface unit 804 connected to the system bus 822. It should be appreciated that the network interface unit 804 can also be utilized to connect to other types of networks and remote computing systems. The server electronic computing device 108 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the server electronic computing device 108 can store software instructions and data. The software instructions include instructions for one or more software applications 816, including software instructions to execute operations performed by the data de-identification tool 110. The operation of the data de-identification tool 110, including the operations of the PII identifier 202, the PII transformer 210, and the PII re-identification risk assessor 212 are further described in relation to FIGS. 1-7.

The software instructions can also include instructions for an operating system 818 suitable for controlling the operation of the server electronic computing device 108. The mass storage device 814 and/or the RAM 810 also store software instructions, that when executed by the CPU 802, cause the server electronic computing device 108 to provide the functionality of the server electronic computing device 108 discussed in this document. For example, the mass storage device 814 and/or the RAM 810 can store software instructions that, when executed by the CPU 802, cause the server electronic computing device 108 to display received data on a display screen associated with the server electronic computing device 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method to de-identify personally identifiable information (PII) within a structured dataset, the method comprising:
    performing a PII identification operation by:
        receiving the structured dataset, the structured dataset including a plurality of data elements;
        performing a direct identifier detection operation by:
            receiving a direct identifier threshold value;
            based on the direct identifier threshold value, identifying direct identifiers within the structured dataset; and
            creating a non-direct identifier structured dataset by removing the direct identifiers from the structured dataset;
        performing a quasi-identifier detection operation by:
            receiving a quasi-identifier threshold value;
            based on the quasi-identifier threshold value, identifying quasi-identifiers within the non-direct identifier structured dataset; and
            creating a non-quasi-identifier structured dataset by removing the quasi-identifiers from the non-direct identifier structured dataset;
        performing a unique-value detection operation by:
            receiving a unique value threshold value; and
            based on the unique value threshold value, identifying unique values of data elements within the non-quasi identifier structured dataset;
    performing a transformation operation by:
        applying one or more transformation rules to transform each of the direct identifiers, the quasi-identifiers and the unique values into respective de-identified data elements; and
        generating a de-identified structured dataset by replacing the direct identifiers, quasi-identifiers and the unique values within the structured dataset with the respective de-identified data elements.

2. The method of claim 1, further comprising:
    performing a re-identification risk assessment operation by calculating a probability of re-identification score by using:

$$\text{Probability of re-identification score} = \frac{1}{\text{Size of equivalence class}}$$

wherein equivalence class is a number of unique groups of data that can be created within the de-identified structured dataset upon removal of the direct identifiers.

3. The method of claim 2, wherein performing the re-identification risk assessment operation further comprises:
receiving a re-identification threshold value;
comparing the probability of re-identification score to the re-identification threshold value;
upon determining that the probability of re-identification score meets or exceeds the re-identification threshold value:
generating an adjusted quasi-identifier threshold value by reducing the quasi-identifier threshold value by a predetermined amount; and
until determining that the probability of re-identification score is less than the re-identification threshold value, iteratively repeating performing the quasi-identifier detection operation, the unique-value detection operation, the transformation operation and the re-identification risk assessment operation after replacing the quasi-identifier threshold value with the adjusted quasi-identifier threshold value.

4. The method of claim 1, wherein identifying the direct identifiers in the structured dataset includes:
calculating a normalized entropy score for each data element of the plurality of data elements of the structured dataset;
for each data element of the plurality of data elements of the structured dataset:
comparing the normalized entropy score of the data element to the direct identifier threshold value; and
upon determining that the normalized entropy score meets or exceeds the direct identifier threshold value, identifying the data element as including direct identifiers.

5. The method of claim 4, wherein the normalized entropy score of a data element X is calculated using:

$$H(X) = \frac{-\sum_{i=1}^{N} p(x_i) * \log_2 p(x_i)}{\text{max entropy score}}$$

wherein, $H(X)$ is the normalized entropy score of the data element X, N is a total number of possible outcomes for the data element X, $p(x_i)$ is a probability of each of the possible outcomes of the data element X occurring, $\Sigma$ denotes a sum of all possible outcomes for the data element X and the max entropy score is calculated using the equation $-\Sigma_{i=1}^{N} p(x_i) * \log_2 p(x_i)$ where $p(x_i)$ is equal to 1/N.

6. The method of claim 1, wherein identifying the quasi-identifiers in the non-direct identifier dataset includes:
calculating a normalized entropy score and an external influence score for each data element of the plurality of data elements of the non-direct identifier structured dataset;
creating a combined score each data element of the plurality of data elements of the non-direct identifier structured dataset by combining the normalized entropy score and the external influence score;
for each data element of the plurality of data elements of the non-direct identifier structured dataset:
comparing the combined score of the data element to the quasi-identifier threshold value; and
upon determining that the combined score meets or exceeds the quasi-identifier threshold value, identifying the data element as including quasi-identifiers.

7. The method of claim 6, wherein the normalized entropy score of a data element X is calculated using $$H(X) = \frac{-\sum_{i=1}^{N} p(x_i) * \log_2 p(x_i)}{\text{max entropy score}}$$

wherein, $H(X)$ is the normalized entropy score of the data element X, N is a total number of possible outcomes for the data element X, $p(x_i)$ is a probability of each of the possible outcomes of the data element X occurring, $\Sigma$ denotes a sum of all possible outcomes for the data element X and the max entropy score is calculated using the equation $-\Sigma_{i=1}^{N} p(x_i) * \log_2 p(x_i)$ where $p(x_i)$ is equal to 1/N; and
wherein the external influence score of a data element Y is calculated using:

$$\text{External influence score}(Y) = 1 - \frac{N_E(T-Y)}{N_E(T)}$$

wherein, $N_E(T-Y)$ is a number of unique groups that can be formed after the data element Y is removed from the non-direct identifier structured dataset; and $N_E(T)$ is the maximum number of unique groups that can exist within the non-direct identifier structured dataset.

8. The method of claim 1, wherein identifying the unique values in the non-quasi-identifier dataset includes:
calculating an internal influence score for each value of a data element of the plurality of data elements of the non-quasi-identifier structured dataset;
comparing the internal influence score of the data element to unique value threshold value; and
upon determining that the internal influence score meets or exceeds the unique value threshold value, identifying the data element as including unique values.

9. The method of claim 8, wherein the internal influence score of a data element Z is calculated by performing a unique value count for each value in the data element Z.

10. The method of claim 1, wherein applying one or more transformation rules to transform each of the direct identifiers, the quasi-identifiers and the unique values includes:
selecting a transformation rule based on a data type and a category type of each of the direct identifiers, the quasi-identifiers and the unique values, wherein the data type includes: a numeric data type, a string data type, or a date data type; and
wherein the category type includes: a database identifier category or a non-database identifier category.

11. A de-identification system comprising:
one or more processors; and
system memory, the system memory including instructions which, when executed by the processing unit, cause the one or more processors to:
perform a PII identification operation by:
receiving the structured dataset, the structured dataset including a plurality of data elements;

performing a direct identifier detection operation by:
  receiving a direct identifier threshold value;
  for each data element of the plurality of data elements of the structured dataset:
    calculating a first normalized entropy score;
    comparing the first normalized entropy score of the data column to the direct identifier threshold value; and
    upon determining that the first normalized entropy score meets or exceeds the direct identifier threshold value, identifying the data element of the structured dataset as including direct identifiers;
  creating a non-direct identifier structured dataset by removing the direct identifiers from the structured dataset;
performing a quasi-identifier detection operation by:
  receiving a quasi-identifier threshold value;
for each data element of the plurality of data elements of the non-direct identifier structured dataset:
calculating a second normalized entropy score;
calculating an external influence score;
creating a combined score by aggregating the second normalized entropy score to the external influence score;
comparing the combined score to the quasi-identifier threshold value; and
upon determining that the combined score meets or exceeds the quasi-identifier threshold value, identifying the data element of the non-direct identifier structured dataset as including quasi identifiers;
perform a transformation operation by:
applying one or more transformation rules to transform each of the direct identifiers, and the quasi-identifiers into respective de-identified data elements; and
generating a de-identified structured dataset by replacing the direct identifiers and the quasi-identifiers within the structured dataset with the respective de-identified data elements.

12. The de-identification system of claim 11, wherein the instructions further cause the one or more processors to:
  perform a re-identification risk assessment operation by:
  determining a probability of re-identification of personally identifiable information within the de-identified structured dataset;
  upon determining that the probability of re-identification meets or exceeds a predetermined re-identification threshold value,
  generating an adjusted quasi-identifier threshold value by reducing the quasi-identifier threshold value by a predetermined amount;
  until determining that the probability of re-identification score is less than the re-identification threshold value, iteratively repeating the quasi-identifier detection operation, the transformation operation and the re-identification risk assessment operation after replacing the quasi-identifier threshold value with the adjusted quasi-identifier threshold value.

13. The de-identification system of claim 11, wherein the instructions further cause the one or more processors to:
  create a non-quasi-identifier structured dataset by removing the quasi-identifiers from the non-direct identifier structured dataset;
  receiving a unique value threshold value;
  for each value of a data element of the plurality of data elements of the non-quasi-identifier structured dataset:
    calculating an internal influence score;
    comparing the internal influence score to the unique value threshold value; and
    upon determining that the internal influence score meets or exceeds the unique value threshold value, identifying the data element of the non-quasi-identifier structured dataset as including unique values.

14. The system of claim 11, wherein the probability of re-identification score is calculated using:

$$\text{Probability of re-identification score} = \frac{1}{\text{Size of equivalence class}}$$

wherein equivalence class is a number of unique groups of data that can be created within the de-identified structured dataset upon removal of the direct identifiers.

15. The system of claim 11, wherein applying one or more transformation rules to transform each of the direct identifiers, and the quasi-identifiers into respective de-identified data elements includes:
  selecting a transformation rule based on a data type and a category type of each of the direct identifiers and the quasi-identifiers,
  wherein the data type includes: a numeric data type, a string data type, or a date data type; and
  wherein the category type includes: a database identifier category or a non-database identifier category.

16. The system of claim 15, wherein applying the one or more transformation rules to transform each of the direct identifiers includes:
  upon determining that the data type of the direct identifier is the numeric data type and the category type of the direct identifier is the non-database identifier category, applying a binning transformation rule or a generalization transformation rule;
  upon determining that the data type of the direct identifier is the numeric data type and the category type of the direct identifier is the database identifier category, applying a numerical offset transformation rule;
  upon determining that the data type of the direct identifier is the string data type, applying a format preserving encryption transformation rule;
  upon determining that the data type of the direct identifier is the date data type and the category type of the direct identifier is the non-database identifier category, applying a binning transformation rule or a generalization transformation rule; and
  upon determining that the data type of the direct identifier is the date data type and the category type of the direct identifier is the database identifier category, applying a date offset transformation rule.

17. The system of claim 15, wherein applying the one or more transformation rules to transform each of the quasi-identifiers includes:
  upon determining that the data type of the quasi-identifier is the numeric data type and the category type of the direct identifier is the non-database identifier category, applying a binning transformation rule or a generalization transformation rule;
  upon determining that the data type of the quasi-identifier is the numeric data type and the category type of the direct identifier is the database identifier category, applying a numerical offset transformation rule;

upon determining that the data type of the quasi-identifier is the string data type and the category type of the direct identifier is the non-database identifier category, applying a categorize transformation rule or a anonymize transformation rule;

upon determining that the data type of the quasi-identifier is the string data type and the category type of the direct identifier is the database identifier category, applying a format preserving encryption transformation rule;

upon determining that the data type of the quasi-identifier is the date data type and the category type of the direct identifier is the non-database identifier category, applying a binning transformation rule or a generalization transformation rule; and upon determining that the data type of the quasi-identifier is the date data type and the category type of the direct identifier is the database identifier category, applying a date offset transformation rule.

18. The system of claim 11, wherein the first normalized entropy score of a data element X is calculated using:

$$H(X) = \frac{-\sum_{i=1}^{N} p(x_i) * \log_2 p(x_i)}{\text{max entropy score}}$$

wherein, H(X) is the normalized entropy score of the data element X, N is a total number of possible outcomes for the data element X, $p(x_i)$ is a probability of each of the possible outcomes of the data element X occurring, $\Sigma$ denotes a sum of all possible outcomes for the data element X and the max entropy score is calculated using the equation $-\Sigma_{i=1}^{N} p(x_i) * \log_2 p(x_i)$ where $p(x_i)$ is equal to 1/N.

19. The system of claim 11, wherein the second normalized entropy score of a data element X is calculated using $$H(X) = \frac{-\sum_{i=1}^{N} p(x_i) * \log_2 p(x_i)}{\text{max entropy score}}$$

wherein, H(X) is the normalized entropy score of the data element X, N is a total number of possible outcomes for the data element X, $p(x_i)$ is a probability of each of the possible outcomes of the data element X occurring, $\Sigma$ denotes a sum of all possible outcomes for the data element X and the max entropy score is calculated using the equation $-\Sigma_{i=1}^{N} p(x_i) * \log_2 p(x_i)$ where $p(x_i)$ is equal to 1/N; and wherein the external influence score of a data element Y is calculated using:

$$\text{External influence score}(Y) = 1 - \frac{N_E(T-Y)}{N_E(T)}$$

wherein, $N_E(T-Y)$ is a number of unique groups that can be formed after the data element Y is removed from the non-direct identifier structured dataset; and $N_E(T)$ is the maximum number of unique groups that can exist within the non-direct identifier structured dataset.

20. A method to de-identify personally identifiable information (PII) within a structured dataset, the method comprising:

performing a PII identification operation by:
receiving the structured dataset, the structured dataset including a plurality of data elements;
performing a direct identifier detection operation by:
identifying direct identifiers within the structured dataset based on a direct identifier threshold value; and
creating a non-direct identifier structured dataset by removing the direct identifiers from the structured dataset;
performing a quasi-identifier detection operation by:
identifying quasi-identifiers within the non-direct identifier structured dataset based on a quasi-identifier threshold value; and
creating a non-quasi-identifier structured dataset by removing the quasi-identifiers from the non-direct identifier structured dataset;
performing a unique value detection operation by:
identifying unique values within the non-quasi-identifier structured dataset based on a unique value threshold value;

performing a transformation operation by:
applying one or more transformation rules to transform each of the direct identifiers, the quasi-identifiers and the unique values into respective de-identified data elements; and
generating the de-identified structured dataset by replacing the direct identifiers, the quasi-identifiers and the unique values within the structured dataset with the respective de-identified data elements;

performing a re-identification risk assessment operation by:
evaluating a risk of re-identification of the PII within the de-identified structured dataset;
upon determining that the risk of re-identification of the PII within the de-identified structured dataset meets or exceeds a predetermined re-identification threshold value,
generating an adjusted quasi-identifier threshold values by reducing the quasi-identifier threshold value by a first predetermined amount;
generating an adjusted unique value threshold value by reducing the unique value threshold value by a second predetermined amount; and
until determining that the risk of re-identification of the PII within the de-identified structured dataset is less than the re-identification threshold value, iteratively repeating the quasi-identifier detection operation, the unique value detection operation, the transformation operation and the re-identification risk assessment operation after replacing the quasi-identifier threshold value with the adjusted quasi-identifier threshold value and replacing the unique value threshold value with the adjusted unique value threshold value.

\* \* \* \* \*